Oct. 4, 1938.  E. A. ROCKWELL ET AL  2,131,787
POWER TRANSMITTING DEVICE
Filed July 3, 1934  4 Sheets-Sheet 1
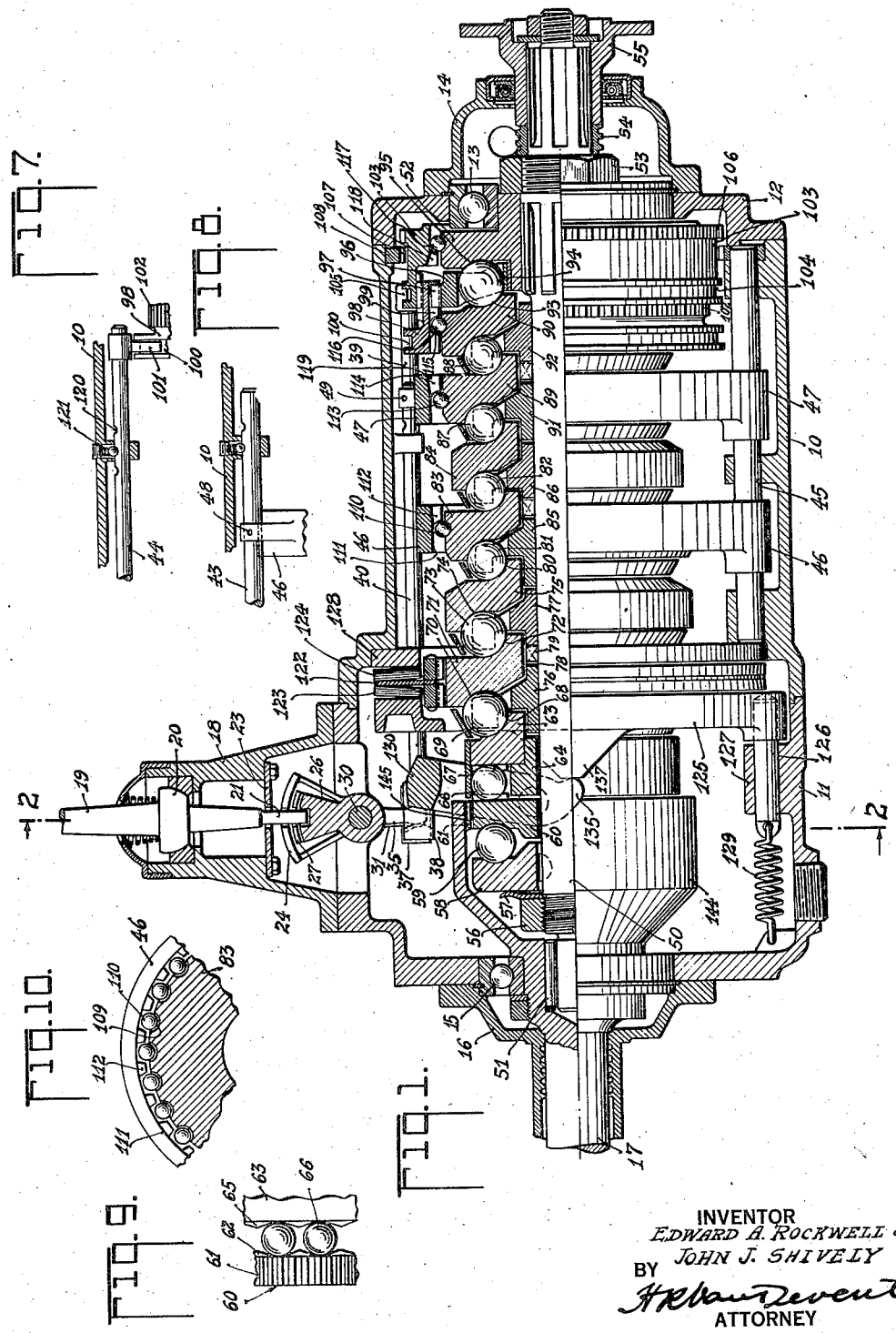
INVENTOR
EDWARD A. ROCKWELL &
JOHN J. SHIVELY
BY
ATTORNEY

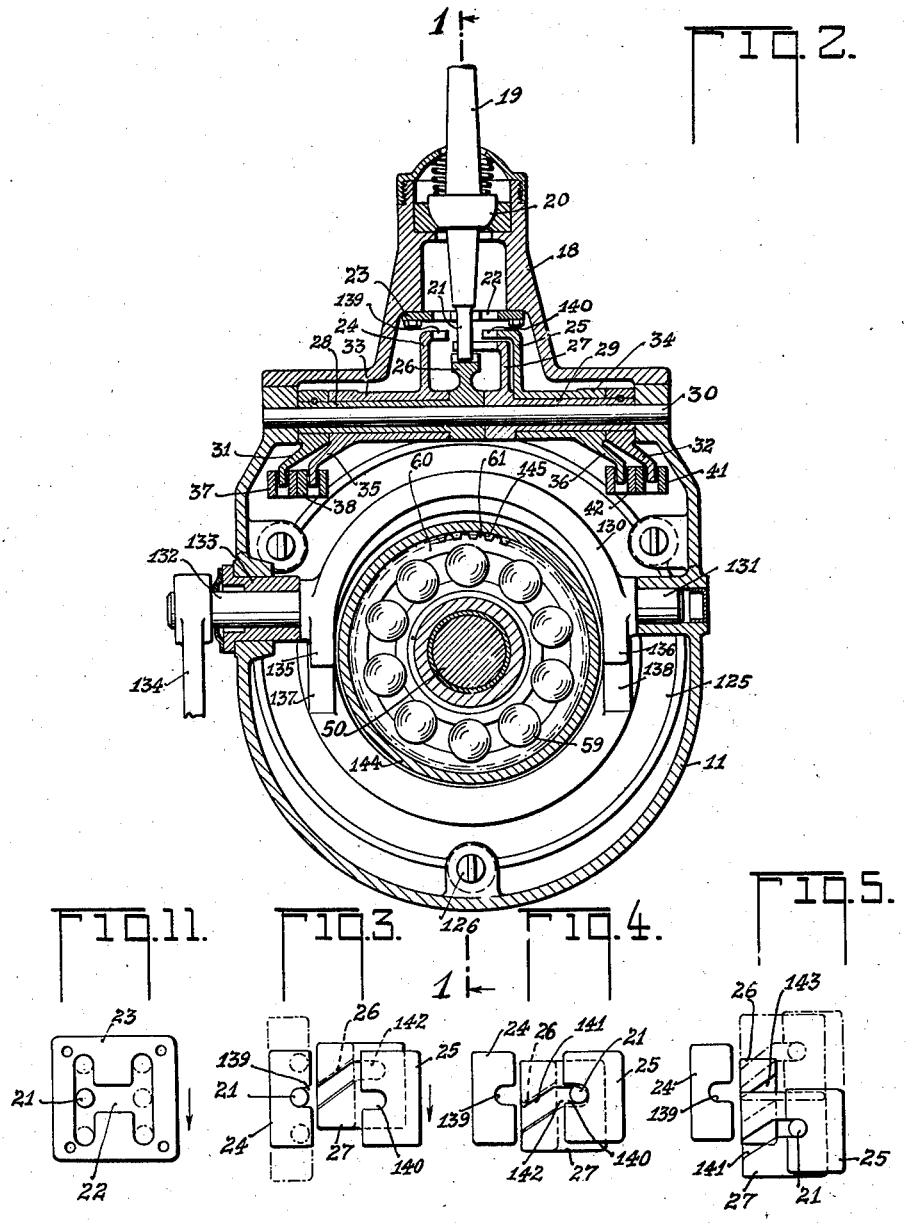

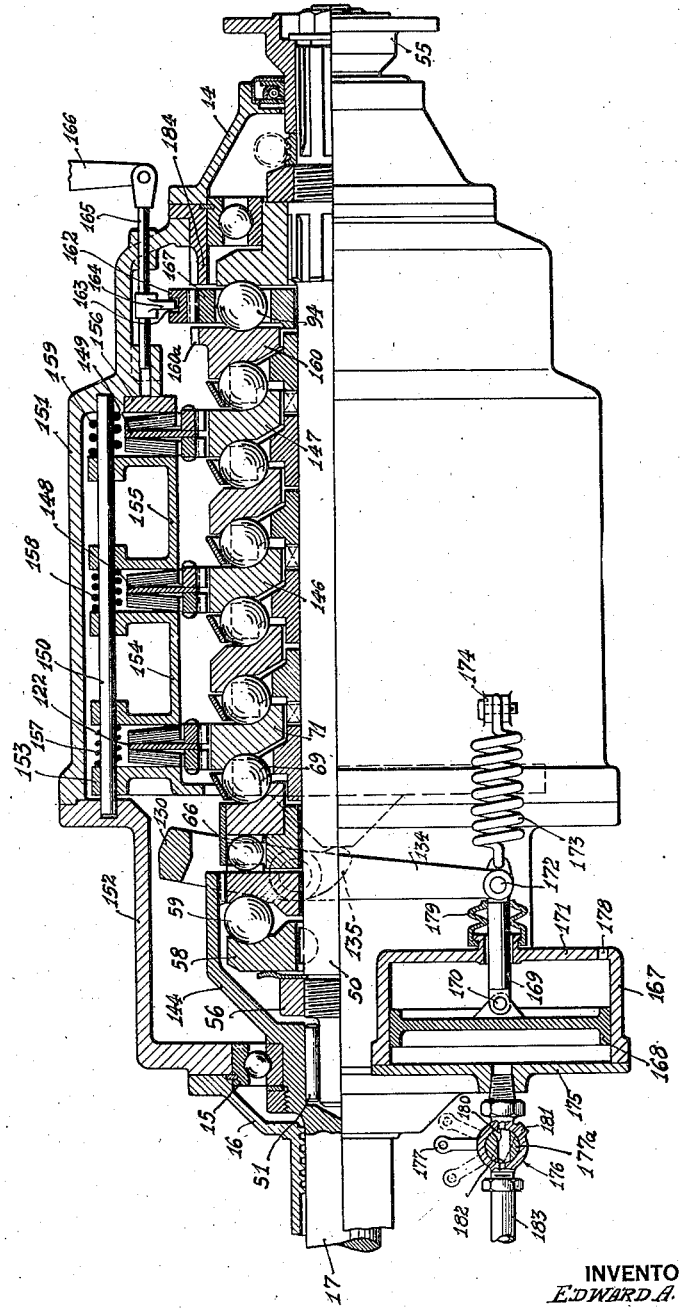

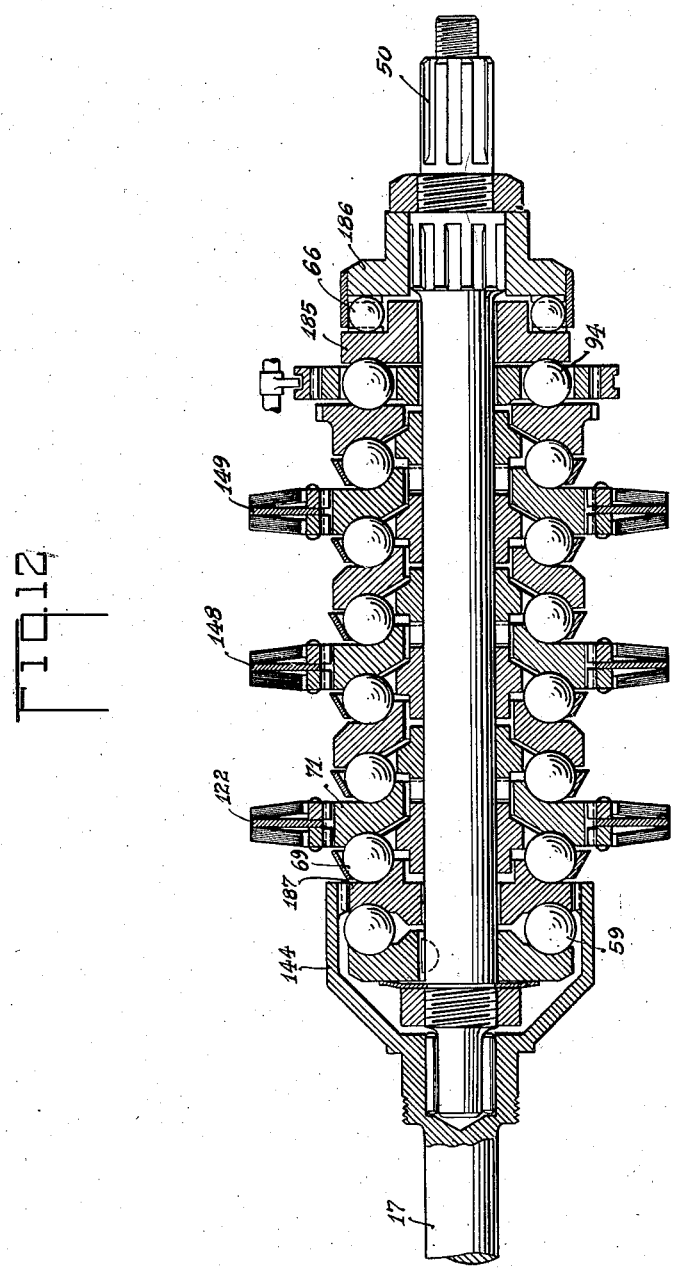

Patented Oct. 4, 1938

2,131,787

UNITED STATES PATENT OFFICE 2,131,787

POWER TRANSMITTING DEVICE

Edward A. Rockwell and John J. Shively, New York, N. Y., assignors to Patent Engineering Corporation, a corporation of Delaware Application July 3, 1934, Serial No. 733,598

14 Claims. (Cl. 74—263)

This invention pertains to change speed power transmitting mechanisms, and particularly to automotive transmissions.

In our pending application filed February 1, 1934, Serial No. 709,319, is shown and described a change speed device making use of rolling friction between balls and races to provide one stage of a transmission, the said stage being controllable by an operative condition of the vehicle.

The purpose of the present invention is to provide a transmission in which all speeds are obtained through ball trains without gearing.

A further purpose is to provide a transmission of the above type in which all forward speeds may be controllable by an operative condition of the vehicle.

In pursuance of the above purposes suitable apparatus is herein described in accordance with the attached drawings, in which Fig. 1 is a longitudinal section of a four-speed transmission adapted to manual control of the lower gear ratios.

Fig. 2 is a transverse section of the same in the plane 2—2 Fig. 1.

Fig. 3 is a detail view of the manual shift illustrating low and reverse positions.

Fig. 4 is a view of the same illustrating neutral position.

Fig. 5 illustrates second and third-speed positions.

Fig. 6 is a longitudinal section of a four-speed transmission controllable by fluid pressure in all forward stages.

Figs. 7 and 8 are fragmental views of the shifter rods.

Fig. 9 is a fragmental view of the torque wedge.

Fig. 10 is a detail view of a shift clutch.

Fig. 11 is a plan view of the H-gate.

Fig. 12 is a longitudinal section of an alternative structure to that of Fig. 6, showing the driving parts.

The transmission shown in Figs. 1 and 2 is provided with a main casing 10 to which is attached a forward extension or member 11. A rear plate 12 attached to main casing 10 supports the usual rear shaft ball bearing 13 which is retained by an end cap 14. A forward ball bearing 15 is retained in the forward casing member 11 by the usual clutch sleeve plate 16.

A shaft 17 journalled in the bearing 15 is adapted to carry the driven member of a clutch of any suitable type (not shown).

A tower 18, fastened to the top of forward casing member 11, supports a shift lever 19 in a spherical bearing 20. The lever 19 has a lower extension 21 guided by an H-slot or gate 22 in a stationary plate 23 and adapted to engage shifter forks 24, 25, 26 and 27, (Fig. 2) in a manner hereinafter described. The forks 26 and 27 are formed integrally with or suitably attached to sleeves 28 and 29 respectively, which are rotatably mounted on a stationary cross rod 30 and carry downwardly extending levers 31 and 32. Sleeves 33 and 34, rotatably mounted on the sleeves 28 and 29 carry forks 24 and 25 and downwardly extending levers 35 and 36.

The levers 31 and 35 engage yoke ends 37 and 38 respectively of rods 39 and 40 slidable in the casing 10.

The levers 32 and 36 similarly engage yoke ends 41 and 42 of the rods 43 and 44 shown fragmentally in Figs. 7 and 8 and also slidable in the casing 10.

The casing 10 contains three guide rods of which guide rod 45, Fig. 1, is typical. Shifter rings 46 and 47, Fig. 1, are longitudinally slidable thereon and are fastened by any suitable means such as pins 48 and 49 to shifter rods 43 and 40 respectively as shown in Figs. 1 and 8.

A driven shaft 50, Figs. 1 and 2, is piloted at the front end in a bearing 51 in the clutch shaft 17. A driven collar 52, splined to driven shaft 50 and backed by a rear thrust nut 53 screwed on the latter, is supported in the rear bearing 13 which thereby also supports the driven shaft 50. The shaft 50 also carries the usual speedometer worm 54 and coupling member 55.

Screwed to the shaft 50 behind the pilot bearing 51 is a forward thrust nut 56 pressing against a spring ring 57 which in turn presses against a forward thrust bearing race ring 58 which is slidably keyed on the shaft 50.

A set of thrust balls 59 is disposed between the race ring 58 and a rear thrust race member 60 which is rotatably mounted on shaft 50 and has external teeth 61.

The member 60 is formed on its rear or right hand face with a series of angular recesses 62 as shown in Fig. 9. A driving ring 63, supported on a bushing 64 rotatable on the shaft 50, is formed with forward angular recesses 65, Fig. 9. A set of wedging balls 66 is engagedly disposed in the recesses 62 and 64 and is retained therein radially by a sleeve 67, Fig. 1.

The driving ring 63 has an exterior angular race 68 engaging a set of driving balls 69 which in turn engage an interior angular race 70 of a rotative intermediate or reaction member 71. The intermediate member 71 also has an exterior angular race 72 engaging a second set of driving balls 73 which engage the interior angular race 74 of a rotative member 75. Ball sets 69 and 73 are provided respectively with spiders or cages 76 and 77, rotatably mounted on shaft 50 and locked together by dog teeth 78 and 79.

The members 63 and 75, together with ball sets 69 and 73, intermediate member 71 and interlocked cages 76 and 77 make up the power transmitting elements of a speed reducing device of the type fully explained in our previous application Serial No. 709,319 and hereinafter referred to as the first planetary set.

An exterior angular race 80 of the member 75 acts as a driving race for a second planetary set comprising in addition thereto the ball trains 81 and 82, an intermediate or reaction member 83, a driven member 84 and the interlocked spiders or cages 85 and 86.

Driven member 84 in turn acts as the driving member for a third planetary set also comprising ball trains 87 and 88, intermediate member 89, driven member 90 and interlocked spiders or cages 91 and 92.

The driven member 90 of the third planetary set has a rear race 93 engaging a set of reversing balls 94 which also engage the race 95 of final driven collar 52. Reversing balls 94 are provided with a separator cage 96 having exterior teeth 97.

A sleeve 98 has interior teeth 99 slidable on the teeth 97 of cage 96, and is formed with a circumferential groove 100 engaged by a finger 101 on shifter rod 44 as shown in Fig. 7. Sleeve 98 also has exterior teeth 102 on which is slidable a second interiorly toothed sleeve 103. Sleeve 103 is provided with a circumferential groove 104 engaged by finger 105 on the shifter rod 39. Sleeve 103 carries short exterior teeth 106 adapted to engage interior teeth 107 of a ring 108 fastened to the casing 10. The intermediate or reaction member 83 of the second planetary set contains a series of circumferential sockets 109 as shown in Fig. 10, containing balls 110 retained therein by the shifter ring 46. The shifter ring 46 has an interior cylindrical portion or idling bore 111 extending through part of its length, and a series of internal teeth 112 adapted to mesh between the balls 110 so as to lock the member 83 to the shifter ring 46.

Intermediate member 89 carries a similar set of balls 113 adapted to be engaged by teeth 114 in the shifter ring 47. Driven member 90 also carries a set of clutching balls 115 adapted to be engaged by teeth 99 of sleeve 98, the teeth 99 being cut away at 116 to provide an idling race for balls 115. A similar set of clutching balls 117 socketed in the driven collar 52, is adapted to be engaged by forward interior teeth 118 in the second sleeve 103.

From the foregoing it will be seen that when ring 46 is moved to the left by rod 43 (Fig. 8) the teeth 112 mesh with the balls 110 to lock member 83 to the ring 46 which is restrained from turning by stationary rods 45. Similarly, when ring 47 is moved to the left by rod 40, the teeth 114 mesh with balls 113 to lock intermediate member 89.

When the sleeve 98 is moved either to left or right by rod 44 (Fig. 7) the balls 115 are engaged by teeth 99, thereby rotatively locking driven member 90 to cage 96 through the latter's teeth 97.

When the rod 39 moves the second sleeve 103 to the right the teeth 118 mesh with the balls 117, thus rotatively locking the cage 96 to the driven collar 52 through the first sleeve 98. If sleeve 103 is moved to the left its exterior teeth 106 engage teeth 107 of the ring 108, thus locking the cage 96 to the casing 10.

The spaces between teeth adapted to engage the various sets of clutching balls may be outwardly inclined as illustrated at 119, Fig. 1, thereby tending to hold the balls and teeth firmly meshed under load.

The shifter rods are provided with suitable locating devices such as notches 120 and ball latch 121, Fig. 7.

Slidably splined to the circumference of the first intermediate race member 71, Fig. 1, is a brake plate 122 having frictional facings 123 and 124. A pressure plate 125, having fastened thereto guide pins 126 slidably retained in lugs 127 of the forward casing section 11, is adapted to engage the facing 123 so as to force the facing 125 into frictional engagement with a stationary ring 128. Tension springs 129 attached to pins 126 serve to retract the plate 125.

A yoke 130 has shafts 131 and 132, Fig. 2, journalled respectively in casing section 11 and a bushing 133 therein. Shaft 132 extends out through the casing section 11 and carries an exterior operating lever 134. Downwardly extending levers 135 and 136 on yoke 130 engage extensions 137 and 138 of the pressure plate 125.

Referring to Figs. 3, 4 and 5 in which the shifter forks are shown diagrammatically in plan view in the various shift positions referred to the H-gate plate 22, Fig. 11, the forward direction of car motion is indicated by the arrow, Fig. 11. The forks 24 and 25 are of simple type, having central notches 139 and 140. The intermediate fork 27 has an angular slot 141 substantially spanning the space between forks 24 and 25 and terminating in a notch 142 adapted to underlie the notch 140. The lower fork 26 has an inclined slot 143 normally underlying the slot 141 in intermediate fork 27.

Referring again to Figs. 1 and 2, the shaft 17 has formed at its rear end a cup 144 having internal teeth 145 meshing with the teeth 61 on the thrust race member 60.

Referring to Fig. 6 in which parts identical with those already described are indicated by the same numbers, the intermediate race member 71 of the first planetary set carries the brake plate 122 as previously noted.

The intermediate or reaction members 146 and 147 of the second and third planetary sets also have slidably splined thereto the brake plates 148 and 149 respectively.

Three or more guide rods 150, only one of which is shown as the others are identical therewith, are supported in circumferentially spaced relation in the main casing 151 and forward casing section 152. Slidable on the rods 150 are a forward pressure plate 153, a double-faced pressure plate 154 disposed between brake plates 122 and 148, and a second double-faced pressure plate 155 disposed between brake plates 148 and 149. A back friction plate 156 is fixed to the casing 151.

Coil springs 157 space the pressure plate 153 and plate 154 apart. Springs 158, heavier than 157, space plates 154 and 155 apart, while still heavier springs 159 space the plate 155 to the left from the stationary friction plate 156. The springs just described thus normally keep the brake plates free of the friction applying plates.

The driven member 160 of the third planetary set, which is also the driving race member for the reverse balls 94, has external spline teeth 160a.

The cage 161 for the reverse balls 94 has slidably splined thereto a ring 162 having a groove 163 engaged by a finger 164 on a shifter rod 165 slidable in the casing 151 and provided with an external control connection of any suitable type such as a manually operable lever 166.

External to the forward casing member 152, but secured thereto is a cylinder 167 in which is slidable a sealing piston 168. A link rod 169, pivoted at 170 to the piston 168, extends through the head 171 of cylinder 167 and is pivotally connected to the end of the exterior yoke lever 134 at 172. A heavy tension spring 173 stressed between the pivot 172 and a lug 174 formed on the casing 151, urges the lever 134 and piston 168 to the right.

The cylinder 167 is closed at the left by a sealing end plate 175 into which is connected a three-way valve 176 having an operating lever 177 and a rotatable port plug 177a. The cylinder head 171 contains a vent hole 178. The rod 169 may be provided with the usual dust boot 179.

The three-way valve 176 controls a port 180 leading into the cylinder 167, an atmospheric vent port 181, and a port 182 leading to a tube 183 adapted to be connected to a source of vacuum, preferably the inlet manifold of an automotive engine (not shown).

The operation of the device is as follows, referring first to the type shown in Fig. 1.

When power is applied through the shaft 17 and cup 144 the member 60 is revolved and carries with it the driving ring 63 due to the balls 66 confined in the angular recesses 62 and 65. The spring 57 being initially flexed between the thrust race ring 58 and the nut 56, places an axial thrust through the driving parts which exerts a tractive friction between all the balls and races back to the driven member 52. As the load builds up the balls 66 tend to roll up the faces of the recesses 62 and 65. A wedging action is thus set up which exerts an increased axial thrust proportional to the torque transmitted by the balls 66. The angles of the recesses 62 and 65 are made such that the thrust set up, which is resisted by the thrust balls 59, is sufficient to prevent slip between the driving parts at all loads.

The drive through the first planetary set which may be either direct or with a reducing ratio, takes place as follows:

For a reduced ratio, the yoke 130 is swung counter-clockwise by exterior means such as spring 173, Fig. 6, acting through the lever 134. The extensions 135 of yoke 130 move the pressure plate 125 to the right, engaging the friction facing 123, forcing the facing 124 into engagement with the ring 128, and thus restraining the plate 122 and intermediate member 71 from rotation.

The driving race 68 now rolls the balls 69 forward on the race 70, carrying with them the spider 76. The spider 77, being interlocked with 76 by the dog teeth 78 and 79, is carried around with it. The second balls 73 are thus also carried around, rolling on the race 72 and driving the member 75 at a rotative speed reduced from that of the driving member 63 in the proportion of the effective diameters of races 68 and 74.

When the brake plate 122 is released, leaving the intermediate member free to rotate, no stationary torque reaction is applied between the driving member 63 and member 75. No drive at reduced speed is therefore possible between these members, consequently the device must either idle or drive at direct or one to one ratio. For idling to take place, the cages 76 and 77 must revolve at different speeds relative to the intermediate member 71. This however, is impossible, as the cages are locked together by their dog teeth. As a consequence the balls, races and cages lock together and revolve as a unit, transmitting a direct drive.

In the same manner, the second planetary set may be made to transmit a reduced or a direct drive from the member 75 to member 84 by restraining or releasing the member 83 by means of the shifter ring 46. Similarly meshing or unmeshing the shifter ring 47 causes the third planetary set to transmit a reduced or a direct drive to the member 90.

When cage 96 is locked to member 90 by means of the sleeve 98 as previously described, the reversing balls 94 cannot roll, and since the thrust of the torque wedge balls 66 prevents slip, the driven ring 52 and shaft 50 are driven forward at the speed of member 90.

A similar direct drive occurs if the cage 96 is locked to the driven member 52 by the second sleeve 103. If the sleeve 98 is placed in neutral position as shown in Fig. 1, and the cage 96 is held stationary by sliding the second sleeve 103 into engagement with the ring 108, the balls 94 transmit a reverse drive to the driven member 52 and shaft 50.

The operation of the shifting mechanism to give the various desired speed ratios is as follows:

Assuming the first planetary set to be held in reducing ratio by the gripping of brake plate 122 as previously explained, the lower extension 21 of manual lever 19 is moved to the position in the H-gate shown in full lines in Fig. 11. It will be noted that whenever extension 21 is in the cross slot 22 of the H-gate, both forks 24 and 25 are in middle position, in which both sleeves 98 and 103 are in neutral position as shown in Fig. 1. An extension 21 is guided straight to the left, Fig. 11, by slot 22, it engages the angular slots in forks 26 and 27, swinging both forks 26 and 27 toward the rear as shown in Fig. 3. This movement is communicated by the sleeves 28 and 29, levers 31 and 32, and rods 43 and 40 to the shifter rings 46 and 47 which are moved forward, locking the intermediate members 83 and 89 of the second and third planetary sets. Extension 21 having engaged the fork 24, is moved backward, causing the second sleeve 103 to lock the cage 96 to the driven member 52. The device is now in low or first speed, the drive taking place through the combined reduction of the three planetary sets.

If fork 24 is moved to its forward position as indicated by the lower dotted position in Fig. 3, the sleeve 103 locks the cage 96 to the stationary ring 108, giving a reverse drive as previously explained.

When the extension 21 is moved to the right through the slot 22 it throws the forks 26 and 27 forward, thus releasing the intermediate members 83, 89 and engages the fork 25 in the latter's neutral position as shown in Fig. 4. A forward movement of extension 21 moves both forks 27 and 25 forward re-locking the intermediate member 89 and causing the sleeve 98 to lock the cage 96 to the member 90. The drive now takes place through the first and third planetary reductions while the second planetary set revolves as a unit, giving a second speed.

When the extension 21 is moved back to the rear position indicated in Fig. 5 by dashed lines, the third planetary set is released and the cage 96 again locked to the member 90. The drive now takes place through the single reduction of the first planetary set, the second and third sets revolving as units, giving a third speed.

To allow a fourth speed or direct drive, the brake plate 122 is released by operation of the exterior lever 134, which may be effected by a fluid pressure actuated piston such as 168, Fig. 6. When vacuum is applied to the left of piston 168 the increase of effective atmospheric pressure on the right thereof moves the piston 168 to the left, overcoming the tension of spring 173 to swing the lever 134 and release the brake as previously explained. All planetary sets now revolve as a unit, and a direct drive occurs through the transmission.

In the type of transmission shown in Fig. 6, all planetary sets are controlled by brakes, the only manual shift being that required to slide the sleeve 162 into mesh with the member 160 or with a stationary ring 184 to give forward and reverse drives respectively.

Assuming the cylinder 167 to be connected to the inlet manifold of the motor, the vent valve being shut as shown in Fig. 6, the effective pressure on the right side of piston 168 will be dependent on the inlet vacuum which is dependent on the speed and torque of the motor. When the vacuum rises during light loading and at high motor speeds under moderate loads, the pressure on the right side of piston 168 holds the latter to the left against the pull of the spring 173. The springs 157, 158 and 159 hold the various pressure plates apart, freeing the brake plates 122, 148 and 149 so that the device revolves as a unit in direct or highest driving ratio.

As the motor load increases the vacuum falls, decreasing the resistance of the piston 168 to the spring 173 until when a certain loading is reached as predetermined by the proportion of the parts and strength of the springs, the spring 173 overcomes the relatively light springs 157 and causes the brake plate 122 to be gripped between the pressure plates 153 and 154. The intermediate member 71 is thereby stopped causing the first planetary set to drive at reduced ratio and placing the transmission in third speed.

Similarly a further increase in load further increases the effectiveness of spring 173 which applies increased pressure through the first pressure plate 153, first brake plate 122 (which is slidably splined to 71 as previously noted), and second pressure plate 154 to the springs 158 until the latter are overcome. The second brake plate 148 is thereby gripped, causing the second planetary set also to drive at reduced speed and placing the transmission in second speed ratio.

Similarly, a further increase in load causes the springs 159 to be overcome to bring the third planetary set also into reducing operation, the drive now occurring through the three combined reductions which thereby constitute low or first speed.

Under decreasing load the above actions are reversed, the springs 159, 158 and 157 expanding in succession to free their corresponding brake plates and cause the drive to occur through successively smaller reductions up to the direct drive.

The device shown in Fig. 6 thus constitutes an automatic transmission, the various speed ratios being brought into action in response to the fluid pressure effective on the back of piston 168, which pressure is a function of the speed and torque of the engine. If it is desired to modulate the action of the automatic controlling device the valve lever 177 may be swung to the right until the vent port 181 is cracked to any degree desired, thus lowering the vacuum on the left of piston 168 for any given running condition and causing the downward ratio changes to occur at correspondingly lighter motor loads. If it is desired to prevent release of the brake plates irrespective of operating speeds and loads, as for instance while running in reverse, the vent port 181 is opened wide. Both sides of piston 168 are then under atmospheric pressure, and at the same time the port plug 177a closes the port 182 leading to the inlet manifold, thus avoiding unnecessary dumping of air into the fuel mixture.

To hold the transmission in any desired ratio irrespective of engine operation, the valve handle 177 may be swung to the left, closing the port 180 to the cylinder 167, which is thereby deadended to the left of piston 168. No effective pressure change can occur on the piston under this condition, and the device retains the speed ratio in which it was operating when the valve 176 was closed.

The changes from one ratio to another being accomplished by frictional means, occur without shock, each planetary set passing through an infinite number of ratios between direct drive and its maximum reduction as its brake is applied or released. The range between complete gripping of one plate and the gripping of the next is predetermined by the relative strength of the springs 157, 158 and 159. If desired, these strengths may be made such that the stopping of successive plates overlaps, in which case the transmission operates with a continuously variable ratio from direct to low speed drive.

While the springs 157, stronger springs 158 and strongest spring 159 are shown applied respectively to the brakes operating the first, second and third planetary sets, this arrangement is only illustrative, since due to the application of the pressure through the entire set of braking members at the same time the springs will yield successively and throw their planetary sets into action in the manner described irrespective of their location. For example, if desired the springs 159 may be made weakest and 157 the strongest. In this case the third planetary comes into action first as the load increases, the second and first sets following successively. An advantage of this arrangement is that each brake is required to overcome a minimum of torque while bringing its intermediate or reaction member to a stop, as all drive up to the planetary set being controlled is occurring directly from the engine.

By the use of the fluid pressure piston 168 to control the first planetary set of the transmission shown in Fig. 1, as previously described, the operation of this type of transmission is also rendered automatic between direct and third speed, the vent valve 176 being employed to hold the first reduction when operating in the lower ratios and/or to modulate the automatic action. If desired, the valve may be left in the position shown in Fig. 6, in which case automatic shifting occurs between two ratios in all manual shift positions.

Fig. 12 shows an alternative arrangement of the rotative parts of the transmission shown in Fig. 6, the torque wedge balls 66 being located between the rear race member 185 and the final driven member 186. The power is applied by the cup 144 directly to the driving race member 187 of the first planetary set. With this arrangement the wedging action necessary to prevent slip is set up by the output torque and is therefore proportional to the latter. In the higher speed and direct driving, therefore, the rolling parts are not called upon to withstand the thrust necessary to prevent slip in lower ratios. It is obvious that this location of the torque wedge is equally applicable to the transmission shown in Fig. 1.

While the invention is illustrated in preferred form it is not limited to the exact structures shown as various modifications may be made without departing from the scope of the appended claims.

What is claimed is:

1. In a power transmitting device adapted to be driven by an automotive engine, in combination, a power input member, a power output member, a series of planetary sets operatively connected between said members and having each a reaction member, means controllable by an operative condition of said engine to restrain the rotation of said reaction member, said planetary sets being individually adapted to drive at reduced speed when said reaction members are restrained from rotation and to effect a direct drive when said reaction members are released, and means to modify the control of said restraining means by said operative condition.

2. In a power transmitting device, in combination, a series of planetary sets in operative connection and having each a reaction member, braking means adapted to engage said member to effect a speed change and individual means normally holding said braking means out of engagement with said member, and means to apply an increasing force to all said braking means and thereby successively disable said holding means.

3. In a power transmitting device, in combination, a series of planetary sets in operative connection and having each a reaction member, braking means adapted to engage said member to effect a speed change and individual means normally holding said braking means out of engagement with said member, and means to apply an increasing force to all said braking means and thereby successively disable said holding means, said planetary sets being adapted to revolve as units when said braking means are out of engagement.

4. In a power transmitting device, in combination, three planetary sets connected in series having each a reaction member, said planetary sets being adapted to normally revolve as units, means controllable by fluid pressure to restrain the reaction member of said first set from rotation, and manually controllable means to selectively restrain the rotation of the reaction members of said second and third planetary sets whereby a plurality of speed reductions may be effected.

5. In a power transmitting device, in combination, three planetary sets connected in series having each a reaction member, said planetary sets being adapted to normally revolve as units, means controllable by fluid pressure to restrain the reaction member of said first set from rotation, manually controllable means to selectively restrain the rotation of the reaction member of said second and third planetary sets whereby a plurality of speed reductions may be effected, and means to reverse the rotative direction of drive through said device.

6. In a power transmitting device, in combination, a plurality of planetary sets in series, each set comprising a driving race member, a row of driving balls frictionally engaging said driving race member, a driven race member, a second row of driving balls frictionally engaging said driven race member, an intermediate reaction race member frictionally engaging said first and second rows of balls, cages circumferentially spacing said first row of balls, and a second cage circumferentially spacing said second row of balls and rotatively locked to said first cage, and means operable to restrain said reaction members from rotation, said planetary sets being individually adapted to normally revolve as units and to drive at reduced speed when said reaction members are restrained from rotation.

7. In a power transmitting device, in combination, a plurality of planetary sets in series, each set comprising a driving race member, a row of driving balls frictionally engaging said driving race member, a driven race member, a second row of driving balls frictionally engaging said driven race member, an intermediate reaction race member frictionally engaging said first and second rows of balls, a cage circumferentially spacing said first row of balls, and a second cage circumferentially spacing said second row of balls and rotatively locked to said first cage, means to restrain said reaction members from rotation, said planetary sets being individually adapted to normally revolve as units and to drive at reduced speed when said reaction members are restrained from rotation, and means to reverse the rotative direction of drive through said device.

8. In a power transmitting device, in combination, a plurality of planetary sets in series, each set comprising a driving race member, a row of driving balls frictionally engaging said driving race member, a driven race member, a second row of driving balls frictionally engaging said driven race member, an intermediate reaction race member frictionally engaging said first and second rows of balls, a cage circumferentially spacing said first row of balls, and a second cage circumferentially spacing said second row of balls and rotatively locked to said first cage, and means operable to successively restrain said reaction members from rotation, said planetary sets being individually adapted to normally revolve as units and to drive at reduced speed when said reaction members are restrained from rotation.

9. In a power transmitting device, in combination, a plurality of planetary sets in series, each set comprising a driving race member, a row of driving balls frictionally engaging said driving race member, a driven race member, a second row of driving balls frictionally engaging said driven race member, an intermediate reaction race member frictionally engaging said first and second rows of balls, a cage circumferentially spacing said first row of balls, and a second cage circumferentially spacing said second row of balls and rotatively locked to said first cage, and means controllable by fluid pressure to successively restrain said reaction members from rotation, said planetary sets being individually adapted to normally revolve as units and to drive at reduced speed when said reaction members are restrained from rotation.

10. In a power transmitting device, in combination, a plurality of change speed devices in series, individual means operable at different pressures to frictionally control said change speed devices, and means to apply a common variable pressure to said individual means.

11. In a power transmitting device, in combination, a plurality of change speed devices in series, individual means operable at different pressures to frictionally control said change speed devices, and means controllable by fluid pressure to apply a common variable pressure to said individual means.

12. In a power transmitting device adapted to be driven by an automotive engine, in combination, a plurality of change speed devices in series, individual means operable at different pressures to control said change speed devices, and means controllable by an operative function of said engine to apply a common variable pressure to said individual means.

13. In a power transmitting device adapted to be driven by an automotive engine, in combination, a plurality of change speed devices in series, individual means operable at different pressures to control said change speed devices, and means controllable by a function of said engine to apply a common variable pressure to said individual means, said change speed devices being adapted to normally effect a direct drive.

14. In a power transmitting device in combination, a driving member, a driven member, a series of planetary sets adapted to transmit power from said driving to said driven member and having each a reaction member, and means to restrain the rotation of said reaction members, said planetary sets being individually adapted to drive at reduced speed when said reaction members are restrained from rotation and to effect a direct drive when said reaction members are released, by reaction on the reaction members while the reaction members are moving in the same direction as the driven member.

EDWARD A. ROCKWELL.
JOHN J. SHIVELY.